UNITED STATES PATENT OFFICE.

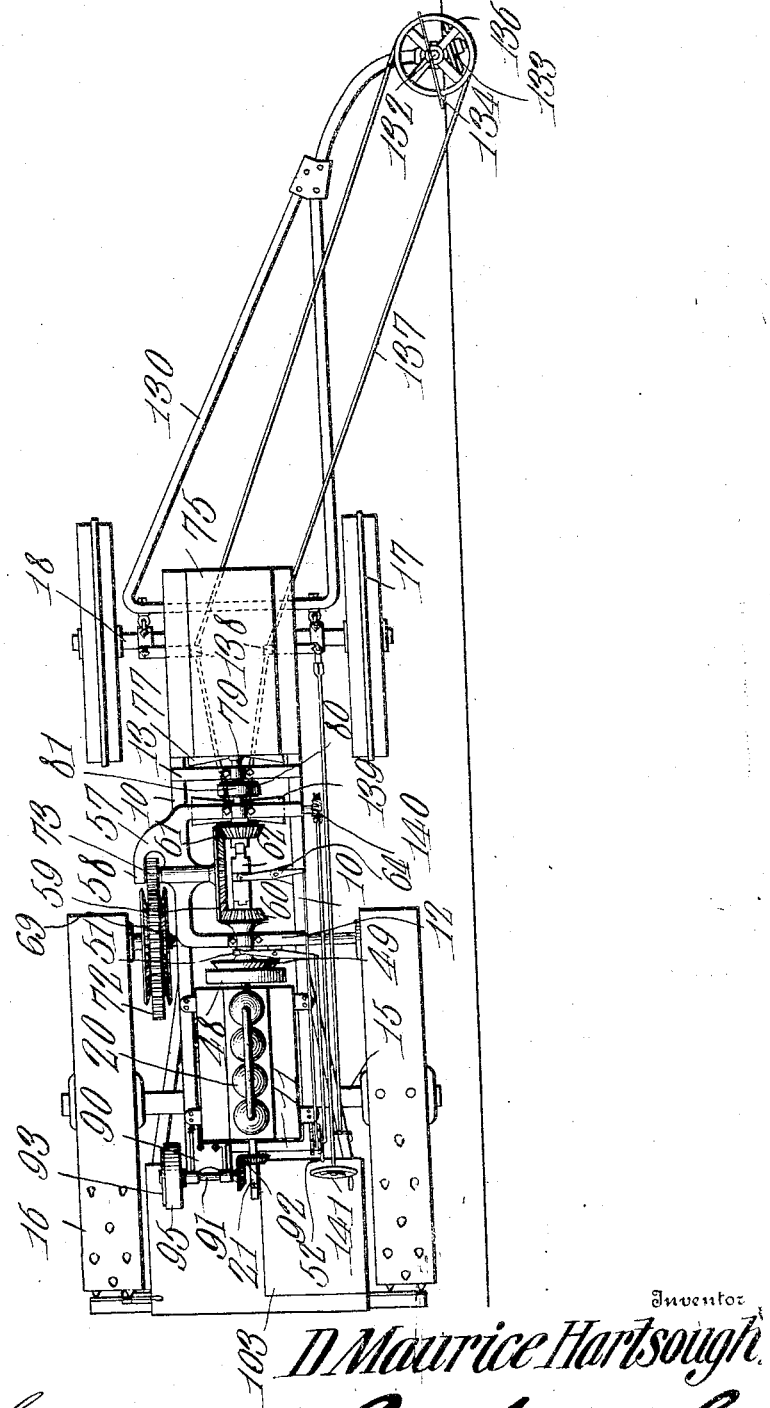

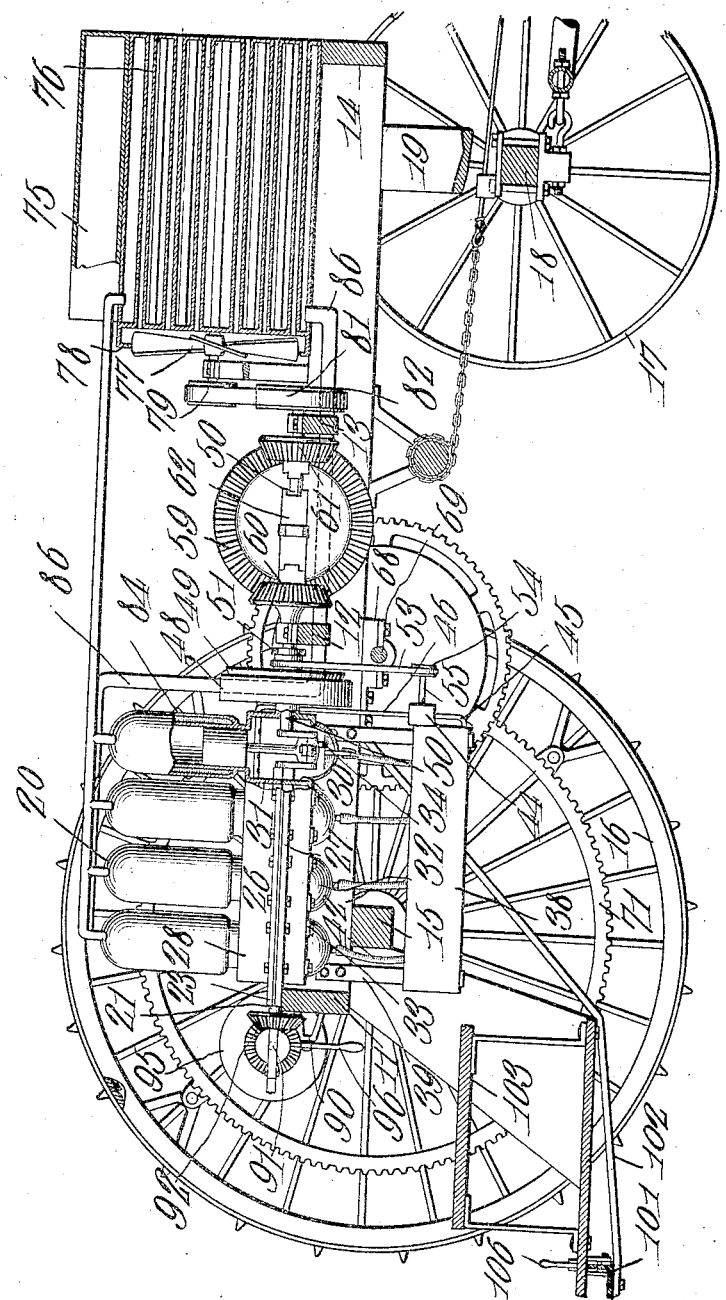

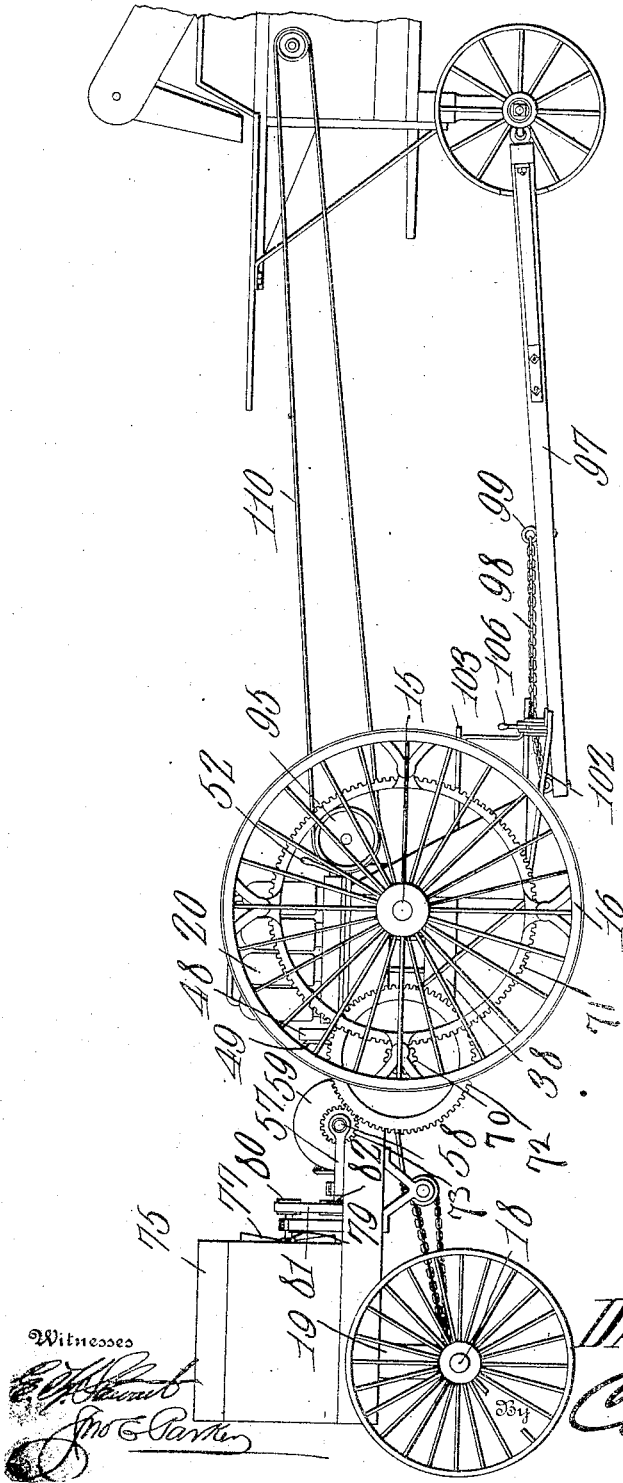

D. MAURICE HARTSOUGH, OF MINNEAPOLIS, MINNESOTA, ASSIGNOR TO GAS TRACTION COMPANY, OF MINNEAPOLIS, MINNESOTA, A CORPORATION OF MINNESOTA.

TRACTION-ENGINE.

1,126,005.  Specification of Letters Patent.  Patented Jan. 26, 1915.

Application filed January 29, 1908. Serial No. 413,285.

*To all whom it may concern:*

Be it known that I, D. MAURICE HARTSOUGH, a citizen of the United States, residing at Minneapolis, in the county of Hennepin and State of Minnesota, have invented a new and useful Traction-Engine, of which the following is a specification.

This invention relates to traction engines, for use in connection with agricultural machinery, and has for its principal object to provide a novel form of engine in which gasolene may be advantageously employed for motive power, thus dispensing with the heavier and more costly steam boiler and engine ordinarily employed, without corresponding decrease in traction power.

A further object of the invention is to construct a novel form of engine in which the parts are so arranged as to insure a low center of gravity, and in which the cylinders and main crank shaft are disposed in a line at a right angle to the length of the rear axle, and in a position between the rear or traction wheels where they are conveniently accessible for examination or repairs.

A still further object of the invention is to provide a novel form of traction engine which may be used in connection with any ordinary thresher or similar machine, either in transit or while the machine is stationary.

Further objects and advantages will appear in the following description, it being understood that various changes in the form, proportions, size and minor details of the structure may be made without departing from the spirit or sacrificing any of the advantages of the invention.

In the accompanying drawings: Figure 1 is a plan view of a traction engine constructed and arranged in accordance with the invention, a portion of the driving shaft and pinion carried thereby for driving one of the traction wheels being removed. Fig. 2 is a vertical sectional view of the same on an enlarged scale. Fig. 3 is a side elevation showing the traction engine coupled to a threshing machine.

Similar numerals of reference are employed to indicate corresponding parts throughout the several figures of the drawings.

The main frame of the machine is substantially rectangular in form and comprises a pair of longitudinal sills 10 which are connected together by transverse bars 11, 12, 13 and 14. The rear axle 15 is secured directly to the frame, and said axle carries a pair of traction wheels 16. The front or steering wheels 17 are carried by an axle 18 that is pivotally connected to a body bolster 19 depending from the frame.

For operating and traction purposes, a four cycle internal combustion engine is employed. The cylinders 20 of the engine are preferably of the same diameter and are disposed in the same line parallel with the length of the frame and directly at the center thereof. All of these cylinders contain pistons of the ordinary type, the pistons being coupled to a crank shaft 21 that is arranged longitudinally of the frame, and is journaled in bearings 23 carried by the two cross bars 11, and 12 of said frame. The cranks of the engines are preferably arranged at different angular positions with respect to each other, so that one or more of the pistons will always positively be driving said shaft, and there will be no danger of stoppage on dead center. The several cranks are inclosed in separate crank casings, the upper sections of all of the crank casings being formed integral with the several cylinders, and being provided with bolting flanges 26 which are connected to similar bolting flanges 27 on casing sections 28, each of these including a vertically disposed partition 30 that is arranged to form a continuation of a partition member 31 carried by the main chamber casting. The lower sections 32 of the crank casings are nearly semi-spherical in form, and each is provided with laterally extending lugs 33 which are bolted or otherwise secured to the inwardly turned bottom flanges of the casing section 28.

Secured rigidly to the shaft at a point beyond the forward end of the crank casing is a clutch disk 48 with which engages a clutch disk 49 that is feathered on a shaft 50 disposed in alinement with the crank shaft. The hub of the disk 49 is provided with an annular groove arranged to receive the bifurcated end of a lever 51 which is connected to an operating lever 52 disposed at the rear of the machine within convenient reach of the operator, so that by manipulating this lever, the two shafts may be connected and disconnected.

At a point between the two cross bars 12 and 13 is arranged an auxiliary frame 57 that is provided with bearings for a shaft 58 that is disposed at a right angle to the length of the crank shaft, and at the inner end of this transverse shaft is a large bevel gear 59 that is in constant mesh with two pinions 60 and 61 that are loosely mounted on the shaft 50, the inner faces of the hubs of these pinions being provided with clutching teeth. Feathered on the shaft 50 at a point between the two pinions is a clutching sleeve 62 having clutching teeth at each end and movable by means of a lever 64, so that it may be engaged with the clutching teeth of either of the bevel pinions, or may be moved to an idle position between said pinions.

To the under sides of the sills 10 are secured bearing blocks 68 in which is mounted a shaft 69 extending transversely of the frame, and to points beyond the opposite sills thereof. The shaft 69 is a sectional shaft, and pinions 70 are mounted at each end thereof, which pinions inter-mesh with large gears 71, that are rigidly secured to the traction wheels of the engine. The sections of the shaft 69 are connected to a compensating gear mechanism 72 of the ordinary construction, the large spur wheel of which intermeshes with a pinion 73, rigidly secured to the shaft 58.

When the bevel pinion 60 is interlocked with the clutching sleeve 62, and, therefore, to the shaft 50 movement is imparted through the shaft 58 and gearing connections described to the traction wheels, in such manner as to propel the wheels in a forward direction. By moving the clutch sleeve to the opposite position, or into engagement with the bevel pinion 61, movement may be imparted to the traction wheels in the opposite direction, so that the traction engine may be run backward when desired.

Secured to the rear portion of the frame are brackets 90 having bearings for the support of a short transverse shaft 91 that is connected to the crank shaft 21 by bevel gearing 92, and to which is secured a friction disk 93. Mounted loosely on the shaft 91 is a driving pulley 95, one face of which is arranged for engagement with the friction disk 93, a lever 96 controlling a clutch member for clutching or releasing the driving pulley from the shaft in a well-known manner.

The driving pulley 95 is intended to transmit movement to a threshing or other machine which is coupled to the traction engine, and provision is made for so connecting the following machine to the engine that power may be transmitted in transit, or the engine may pull the machine along to the field of operation in the usual way and immediately start such machine into operation without the necessity of first uncoupling and reversing the position of the engine as usual, and in fact it is not even necessary to remove the connecting belt.

When traveling to the field of operation, the traction engine may be backed close to the thresher, so that the power transmitting belt 110 which connects the pulley 95 to the driven pulley of the thresher will be slacked.

It will be seen that the driving and propelling mechanism is fully under the control of an operator stationed on the rear platform, and that by manipulating the several clutching devices, the engine may be allowed to run free and then may be coupled to the shaft 50 for the purpose of propelling the device, or may be connected to the power transmitting pulley 95 for the purpose of operating the thresher or other machine, or the threshing machine may be operated in transit.

Attention is here called to the fact that the rear wheels 16, although relatively large in diameter and strong and durable in construction, are comparatively light in weight thus rendering it necessary, or at least desirable, to position the engine cylinders over the rear axle to increase the traction of said wheels.

The rear traction wheels of the vehicle are all of sufficient diameter to extend beyond and above the engine cylinders and oil conductors so as to form in effect a shield or housing for the opposite side of the engine and its associated parts.

I claim:—

1. A traction engine, including in combination a supporting frame, steering wheels for supporting the front end of said frame, traction wheels for supporting the rear end of said frame, a multiple cylinder internal combustion engine carried by said frame, and having a single crank shaft arranged parallel with the longitudinal axis of said frame, and disposed in a position approximately midway of the width of the frame, said engine being located adjacent the rear end of said frame, whereby substantially the entire weight thereof is imposed on the traction wheels, gearing connections between one end of the crank shaft and the traction wheels, said gearing connections including controlling devices whereby said traction wheels may be driven either forward or rearward, a power transmitting shaft at the rear end of said frame, and gearing connections between the crank shaft of the engine and said power transmitting shaft.

2. A traction engine including in combination a supporting frame, steering wheels for supporting the front end of said frame, traction wheels for supporting the rear end of said frame, a multiple cylinder internal combustion engine carried by said frame and having a single crank shaft arranged parallel with the longitudinal axis of said frame and disposed in a position approximately midway of the width of the frame, said engine being located adjacent the rear end of said frame whereby substantially the entire weight thereof is imposed on the traction wheels, gearing connections between the forward end of the crank shaft and the traction wheels, said gearing connections including controlling devices whereby the traction wheels may be driven either forward or rearward, a power transmitting shaft journaled in said frame at the rear end thereof and extending crosswise of the frame, and a gear connection between the rear end of the crank shaft and said power transmitting shaft.

In testimony that I claim the foregoing as my own, I have hereto affixed my signature in the presence of two witnesses.

D. MAURICE HARTSOUGH.

Witnesses:
CHARLES T. THOMPSON,
A. V. A. PETERSON.